United States Patent
Wu

(10) Patent No.: US 12,423,370 B2
(45) Date of Patent: Sep. 23, 2025

(54) LANDING PAGE LOADING METHOD, MEDIUM, AND ELECTRONIC DEVICE

(71) Applicant: Beijing Youzhuju Network Technology Co., Ltd., Beijing (CN)

(72) Inventor: Haiyuan Wu, Los Angeles, CA (US)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/939,247

(22) Filed: Nov. 6, 2024

(65) Prior Publication Data
US 2025/0209128 A1    Jun. 26, 2025

(30) Foreign Application Priority Data
Dec. 26, 2023   (CN) .......................... 202311811690.4

(51) Int. Cl.
*G06F 16/957*   (2019.01)
*G06F 16/955*   (2019.01)

(52) U.S. Cl.
CPC ........ *G06F 16/9574* (2019.01); *G06F 16/955* (2019.01)

(58) Field of Classification Search
CPC ........................... G06F 16/9574; G06F 16/955
See application file for complete search history.

(56) References Cited

U.S. PATENT DOCUMENTS

| | | | | |
|---|---|---|---|---|
| 7,747,749 B1* | 6/2010 | Erikson | ............... | G06F 16/9574 709/219 |
| 9,565,233 B1* | 2/2017 | Ozuysal | ............... | H04L 67/568 |
| 2010/0115388 A1* | 5/2010 | Nguyen | ............... | G06F 16/9574 715/205 |
| 2010/0218106 A1 | 8/2010 | Chen et al. | | |
| 2012/0278185 A1* | 11/2012 | Ramachandran | ...... | G06Q 30/02 709/219 |
| 2015/0195329 A1* | 7/2015 | Jain | ..................... | H04L 67/5681 707/706 |
| 2016/0283606 A1 | 9/2016 | Xiong et al. | | |
| 2017/0102845 A1* | 4/2017 | Ozuysal | ................. | G06F 9/452 |
| 2020/0097614 A1* | 3/2020 | Borkar | ................. | G06F 3/0483 |

FOREIGN PATENT DOCUMENTS

| | | | |
|---|---|---|---|
| CN | 108876450 A | 11/2018 | |
| WO | WO-2015169188 A1 * | 11/2015 | ....... G06F 17/30861 |

OTHER PUBLICATIONS

European Patent Office, Extended European Search Report Issued in Application No. 24210087.3, Apr. 10, 2025, Germany, 10 pages.

* cited by examiner

*Primary Examiner* — Asher D Kells
(74) *Attorney, Agent, or Firm* — Alleman Hall & Tuttle LLP

(57) ABSTRACT

A landing page loading method, a medium, and an electronic device are provided. According to the method, a target loading mode corresponding to a landing page is determined in response to a trigger operation for loading the landing page in a target application, and the landing page is loaded according to the target loading mode. In this way, the target loading mode may be determined based on a preloading status of the landing page in the target application, and the landing page may be loaded according to the target loading mode.

20 Claims, 7 Drawing Sheets

LANDING PAGE LOADING METHOD, MEDIUM, AND ELECTRONIC DEVICE

CROSS REFERENCE TO RELATED APPLICATION

The present application claims the priority and benefits of the Chinese Patent Application No. 202311811690.4, entitled "A Landing Page Loading Method, A Medium, and An Electronic Device" filed on Dec. 26, 2023, the entire content of which is incorporated into the present application by reference.

TECHNICAL FIELD

The present disclosure relates to the field of computer technologies, and specifically, to a landing page loading method, a medium, and an electronic device.

BACKGROUND

A landing page, also referred to as a destination page or a guide page, is a page displayed when a user clicks on a link. The landing page can direct the user to make a product-type visit, so as to achieve a better effect of marketing.

In the related art, a landing page may not be loaded successfully due to problems of a link to a web address of the landing page, a user device, or an application during a redirection to the landing page, which affects the normal display of the landing page.

SUMMARY

The Summary is provided to give a brief overview of concepts, which will be described in detail later in the section Detailed Description. The Summary is neither intended to identify key or necessary features of the claimed technical solutions, nor is it intended to be used to limit the scope of the claimed technical solutions.

According to a first aspect, the present disclosure provides a landing page loading method. The method includes:
- determining a target loading mode corresponding to a landing page in response to a trigger operation for loading a landing page in a target application, where the target loading mode is determined based on a preloading status of the landing page in the target application; and
- loading the landing page according to the target loading mode.

According to a second aspect, the present disclosure provides a landing page loading method performed by a server. The method includes:
- determining a preloading status of a landing page in a target application; and
- determining a target loading mode corresponding to the landing page based on the preloading status, where the target loading mode is used to load the landing page according to the target loading mode.

According to a third aspect, the present disclosure provides a computer-readable medium having a computer program stored thereon, when executed by at least a processor, the program causes the at least processor to:
- determine a target loading mode corresponding to a landing page in response to a trigger operation for loading a landing page in a target application, wherein the target loading mode is determined based on a preloading status of the landing page in the target application; and load the landing page according to the target loading mode.

According to a fourth aspect, the present disclosure provides an electronic device. The electronic device includes:
- a storage apparatus having a computer program stored thereon; and
- at least a processor configured to execute the computer program in the storage apparatus to implement steps of the method according to the first aspect or implement steps of the method according to the second aspect.

Based on the above technical solutions, the target loading mode corresponding to the landing page in the target application is determined in response to the trigger operation for loading the landing page, and the landing page is loaded according to the target loading mode. In this way, the target loading mode may be determined based on the preloading status of the landing page in the target application, and the landing page may be loaded according to the target loading mode. The landing page may be loaded according to another mode when the landing page cannot be loaded in the target application, or the landing page may be directly loaded in the target application when the landing page can be loaded in the target application. This ensures that the landing page configured by an advertiser can be opened successfully, and avoids a situation that the landing page cannot be opened due to a problem of the target application or a problem of a link to a web address. Therefore, a display effect of the landing page is ensured. In addition, the landing page is loaded according to different target loading modes, so that a user can also be prompted whether the landing page has a problem according to the loading mode for the landing page.

The other features and advantages of the present disclosure will be described in detail in the following section Detailed Description.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale. In the accompanying drawings.

DETAILED DESCRIPTION

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of the present disclosure.

It should be understood that the various steps described in the method implementations of the present disclosure may be performed in different orders, and/or performed in parallel. Furthermore, additional steps may be included and/or the execution of some of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" refers to "at least one embodiment". The term "another embodiment" refers to "at least one another embodiment". The term "some embodiments" refers to "at least some embodiments". Related definitions of the other terms will be given in the description below.

It should be noted that concepts, such as "first" and "second" mentioned in the present disclosure are only used to distinguish different apparatuses, modules, or units, and are not used to limit the sequence of functions performed by these apparatuses, modules, or units, or the interdependence relationship.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

Figure 1:
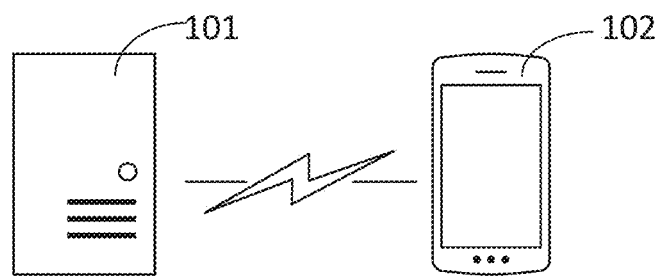
FIG. 1 is a block diagram of a landing page loading system according to some embodiments.

FIG. 1 is a block diagram of a landing page loading system according to some embodiments. A landing page loading method provided in an embodiment of the present disclosure is applicable to the system shown in FIG. 1. As shown in FIG. 1, the system may at least include a terminal device 102 and a server 101. The terminal device 102 and the server 101 may exchange data with each other through a wired or wireless connection.

The server 101 may determine a preloading status of a landing page in a target application, and determine a target loading mode for the landing page in the terminal device based on the preloading status. In response to a trigger operation for loading the landing page in the target application, the terminal device 102 loads the landing page in the terminal device 102 according to the target loading mode that corresponds to the landing page and that is predetermined by the server 101.

Figure 2:
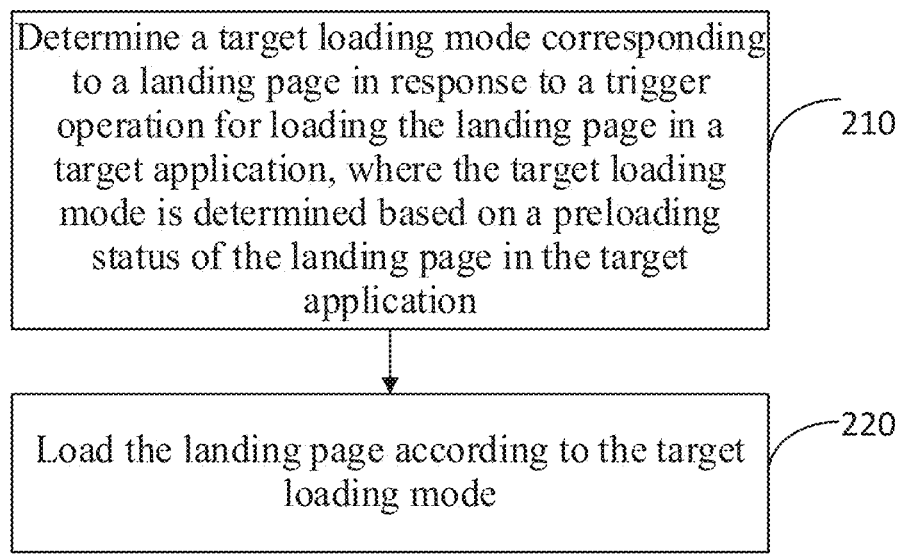
FIG. 2 is a flowchart of a landing page loading method according to some embodiments.

FIG. 2 is a flowchart of a landing page loading method according to some embodiments. As shown in FIG. 2, an embodiment of the present disclosure provides a landing page loading method. The method may be performed by the terminal device shown in FIG. 1 or the server shown in FIG. 1, and specifically the method may be performed by a landing page loading apparatus, where the apparatus may be implemented by software and/or hardware, and is configured in the terminal device or the server. As shown in FIG. 2, the method may include the following steps.

Step 210: Determine a target loading mode corresponding to a landing page in response to a trigger operation for loading the landing page in a target application, where the target loading mode is determined based on a preloading status of the landing page in the target application.

Here, the trigger operation for loading the landing page in the target application may be that a user triggers loading of the landing page in the target application by clicking on a target link in a display interface. Loading the landing page in the target application may refer to displaying the landing page in the target application.

Figure 3:
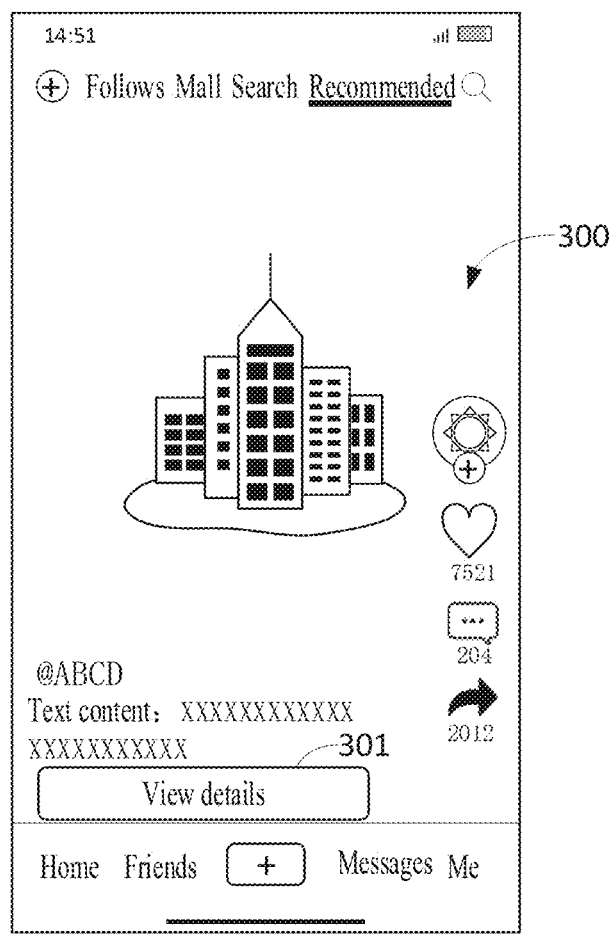
FIG. 3 is a schematic diagram of a target link according to some embodiments.

FIG. 3 is a schematic diagram of a target link according to some embodiments. As shown in FIG. 3, a video is played in a display interface 300 of the target application, and A "View details" control 301 is provided in the display interface 300. When the user clicks on the "View details" control 301, loading of the landing page in the target application is triggered.

A corresponding target loading mode may be provided for each landing page in the target application. The target loading mode may be determined based on a preloading status of the landing page in the target application. The preloading status of the landing page in the target application may be a loading status of the landing page in the target application during testing.

It should be understood that a browser based on webview (web view) or WkWebview (webpage rendering and display) may be configured in the target application, that is, a browser is built in the target application.

In some examples, when an advertiser configures the landing page via a server, the server may obtain the preloading status of the landing page in the target application by loading the landing page via the built-in browser of the target application. Then, the server may match the landing page with the corresponding target loading mode based on the preloading status corresponding to the landing page.

It should be noted that the built-in browser of the target application may fail to load the landing page because environment configuration information of the built-in browser of the target application cannot be consistent with that of a mainstream external browser. Or, the built-in browser of the target application may fail to load the landing page because a link to a web address (which may also be referred to a uniform resource locator (URL)) corresponding to the landing page has a problem. When the advertiser configures the landing page via the server, the server may pre-test the preloading status of the landing page in the target application, and determine the target loading mode for the landing page in the terminal device based on the preloading status.

It should be noted that landing pages in different preloading statuses may be matched with corresponding target loading modes. For example, the preloading status may include a first state and a second state, where the first state represents that the built-in browser of the target application is able to load the landing page, and the second state represents that the built-in browser of the target application is unable to load the landing page. A corresponding target loading mode may be configured for each of the first state and the second state.

Step 220: Load the landing page according to the target loading mode.

Here, the target loading mode refers to a loading mode for the landing page in the terminal device. After the terminal device determines the target loading mode, the terminal device loads the landing page according to the target loading mode. For example, when the target loading mode is loading the landing page via the built-in browser of the target application, the landing page is loaded in the target application via the built-in browser.

Figure 4:
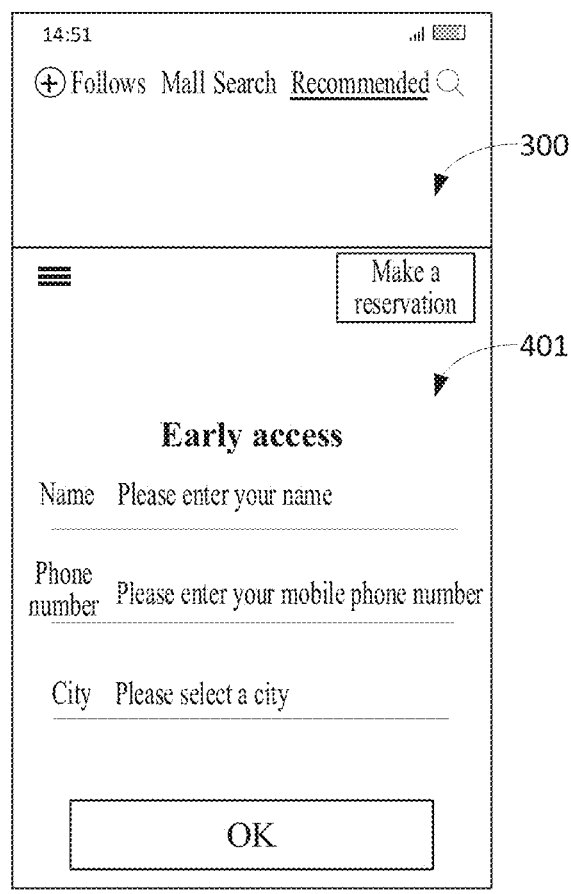
FIG. 4 is a schematic diagram of loading a landing page according to some embodiments.
Figure 5:
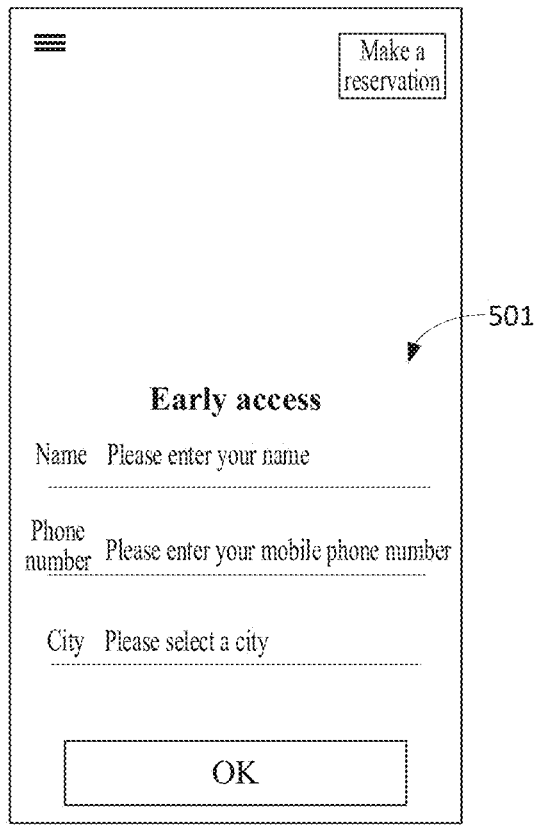
FIG. 5 is a schematic diagram of loading a landing page according to still some embodiments.

It should be understood that a style of the landing page may be configured according to actual requirements. FIG. 4 is a schematic diagram of loading a landing page according to some embodiments. As shown in FIG. 4, when the target loading mode is loading the landing page via the built-in browser of the target application, a first landing page 401 may be displayed in the display interface 300 of the target application. The first landing page 401 may be a page that occupies 70% of a display screen of the terminal device. FIG. 5 is a schematic diagram of loading a landing page according to still some embodiments. As shown in FIG. 5, when the target loading mode is loading the landing page via the built-in browser of the target application, it is possible to jump from the display interface 300 of the target application to display a second landing page 501.

That is, the style of displaying the landing page in the target application may be determined based on a set landing page display style.

Therefore, the target loading mode corresponding to the landing page in the target application is determined in response to the trigger operation for loading the landing page, and the landing page is loaded according to the target loading mode. In this way, the target loading mode may be determined based on the preloading status of the landing page in the target application, and the landing page may be loaded according to the target loading mode. The landing page may be loaded according to another mode when the landing page cannot be loaded in the target application, or the landing page may be directly loaded in the target application when the landing page can be loaded in the target application. This ensures that the landing page configured by the advertiser can be opened successfully, and avoids a situation that the landing page cannot be opened due to a problem of the target application or a problem of the link to the web address. Therefore, a display effect of the landing page is ensured. In addition, the landing page is loaded according to different target loading modes, so that the user can also be prompted whether the landing page has a problem according to the loading mode for the landing page.

In some possible implementations, when the preloading status is the first state, the target loading mode is a first loading mode, that is, the first loading mode is a target loading mode corresponding to the landing page in the first state. The first loading mode is loading the landing page in the target application via the built-in browser of the target application in combination with the link to the web address corresponding to the landing page.

Correspondingly, in step 220, when the target loading mode is the first loading mode, the landing page is loaded in the target application via the built-in browser of the target application in combination with the link to the web address corresponding to the landing page.

Here, when the target loading mode corresponding to the landing page is the first loading mode, the link to the web address corresponding to the landing page may be opened via the built-in browser of the target application, so as to display the landing page in the target application.

That is, if the target loading mode represents loading the landing page via the browser encapsulated by webview or WkWebview, the landing page is loaded in the target application via the browser encapsulated by webview or WkWebview.

As shown in FIG. 3, when the user clicks on the "View details" control 301 in the display interface 300, the first landing page 401 shown in FIG. 4 is displayed.

Therefore, when the built-in browser of the target application is able to load the landing page, the landing page is loaded in the target application via the built-in browser of the target application. Therefore, the landing page is loaded rapidly in the target application, ensuring the user experience.

In some possible implementations, when the preloading status is the second state, the target loading mode is a second loading mode. That is, the second loading mode is a target loading mode corresponding to the landing page in the second state. The second loading mode is a mode calling an external browser to load the landing page based on the link to the web address corresponding to the landing page, so as to load the landing page in the external browser.

Correspondingly, in step 220, when the target loading mode is the second loading mode, the external browser is called to load the landing page based on a link to a web address corresponding to the landing page, so as to load the landing page in the external browser.

Here, when the target loading mode corresponding to the landing page is the second loading mode, the external browser may be called to load the landing page and visit the link to the web address corresponding to the landing page, so as to display the landing page in the external browser.

That is, when the landing page cannot be loaded via the built-in browser of the target application, it is possible to jump from the target application to the external browser, and the external browser is called to access the link to the web address corresponding to the landing page, to display the landing page in the external browser.

As shown in FIG. 3, when the user clicks on the "View details" control 301 in the display interface 300, there is a redirection to the external browser, and the landing page is loaded in the external browser.

It should be noted that if multiple external browsers are installed on the terminal device, a target external browser may be selected from the multiple external browsers. The target external browser may be a default browser set by a system to load a landing page, or may be selected by the user from the multiple external browsers.

Therefore, loading the landing page via the external browser when the built-in browser of the target application is unable to load the landing page can ensure that the landing page can be displayed successfully, ensuring the user experience.

In some embodiments, the terminal device may determine the target loading mode corresponding to the landing page based on a state identifier carried by the landing page.

Here, the state identifier may be associated with the landing page by the server based on a loading mode for the landing page in the target application. The state identifier may be an identifier corresponding to the loading mode for the landing page. For example, when the loading mode corresponding to the landing page is the first loading mode, a state identifier of the first loading state may be a first identifier; or when the loading mode corresponding to the landing page is the second loading mode, a state identifier of the second loading state may be a second identifier.

The loading mode corresponding to the landing page may be determined by the server based on the preloading status of the landing page in the target application. That is, the server may determine the loading mode for the landing page in the target application based on the preloading status of the landing page in the target application, and associate the landing page with the corresponding state identifier based on the determined loading mode for the landing page in the target application, so that the terminal device determines the target loading mode for the landing page in the terminal device based on the state identifier.

For example, the terminal device may determine the target loading mode corresponding to the landing page based on the state identifier carried by the landing page and in combination with a mapping relationship between a state identifier and a loading mode.

In this way, the server associates the corresponding state identifier for the terminal device in advance, and when receiving the trigger operation for loading the landing page in the target application, the terminal device can quickly determine the target loading mode appropriate to the landing page, so as to load the landing page rapidly according to the target loading mode.

In some possible implementations, the preloading status of the landing page in the target application may be obtained by loading the landing page based on the link to the web address corresponding to the landing page via the built-in browser of the target application installed on an emulated device.

A specific method for obtaining the preloading status of the landing page in the target application will be described in detail in the following implementations.

Figure 6:
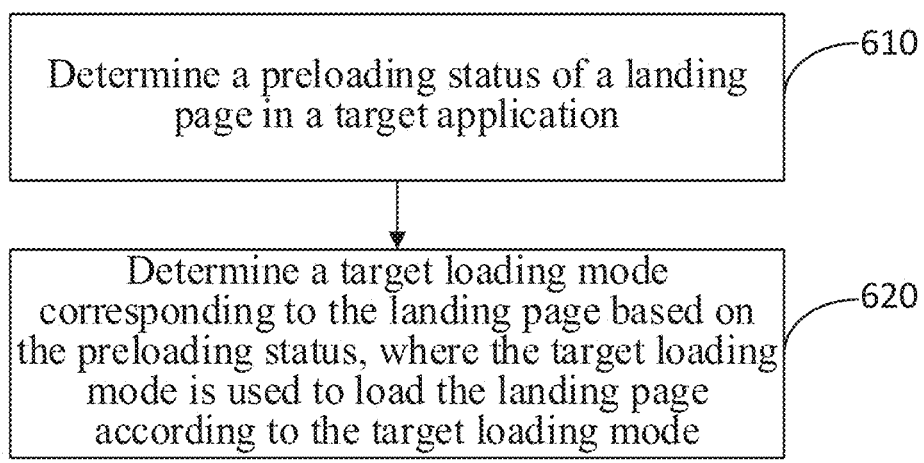
FIG. 6 is a flowchart of a landing page loading method according to still some embodiments.

FIG. 6 is a flowchart of a landing page loading method according to still some embodiments. As shown in FIG. 6, an embodiment of the present disclosure provides a landing page loading method. The method may be performed by the server shown in FIG. 1, and specifically may be performed by a landing page loading apparatus, where the apparatus may be implemented by software and/or hardware, and is configured in the server. As shown in FIG. 6, the method may include the following steps.

Step 610: Determine a preloading status of a landing page in a target application.

Here, the landing page may be a landing page uploaded by an advertiser. The preloading status of the landing page in the target application may be a loading status of the landing page in the target application during testing.

In some embodiments, the server may acquire a link to a web address corresponding to the landing page, and obtain the preloading status of the landing page in the target application by loading the landing page based on the link to the web address via a built-in browser of the target application installed on an emulated device.

The emulated device may be a cloud real machine, and the cloud real machine may be a virtual device constructed by the server using a virtual machine technology or a real device in communicative connection to the server, such as a mobile terminal. A corresponding target application is installed on the emulated device. The server opens the link to the web address corresponding to the landing page via the built-in browser of the target application installed on the emulated device, and determines the preloading status of the landing page in the target application based on a display effect of the landing page.

For example, the server may determine the preloading status of the landing page in the target application based on a display image of the landing page in the target application. For example, if the display frame is a white screen, it indicates that the built-in browser of the target application is unable to load the landing page, and the preloading status may be a second state; or if the display frame is page content of the landing page, it indicates that the built-in browser of the target application is able to load the landing page, and the preloading status may be a first state.

The preloading status of the landing page in the target application may be determined in other implementation manners. For example, the preloading status of the landing page in the target application may be configured by a user.

Step 620: Determine a target loading mode corresponding to the landing page based on the preloading status, where the target loading mode is used to load the landing page according to the target loading mode.

Here, after determining the preloading status corresponding to the landing page, the server may match the landing page with the corresponding target loading mode based on the preloading status. Landing pages in different preloading statuses may be matched with corresponding target loading modes. It should be noted that the target loading mode may refer to a loading mode for the landing page in a terminal device. That is, the target loading mode may be used to enable the terminal device to load the landing page according to the target loading mode in response to a trigger operation for loading the landing page in the target application.

For example, the preloading status may include the first state and the second state, where the first state represents that the built-in browser of the target application is able to load the landing page, and the second state represents that the built-in browser of the target application is unable to load the landing page. A corresponding target loading mode may be configured for each of the first state and the second state.

In some embodiments, when the preloading status is the first state, a first loading mode is determined as the target loading mode, where the first state represents that the built-in browser of the target application is able to load the landing page, and the first loading mode is loading the landing page in the target application via the built-in browser of the target application in combination with a link to a web address corresponding to the landing page.

In some other embodiments, when the preloading status is the second state, a second loading mode is determined as the target loading mode, where the second state represents that the built-in browser of the target application is unable to load the landing page, and the second loading mode is a mode calling an external browser to load the landing page based on a link to a web address corresponding to the landing page, so as to load the landing page in the external browser.

The target loading mode determined by the server enables the terminal device to load the landing page according to the target loading mode when detecting the trigger operation for loading the landing page in the target application. It should be understood that the detailed descriptions for the first loading mode and the second loading mode can refer to the related descriptions in the above embodiments. Details are not described herein again.

In this way, the determining the preloading status of the landing page in the target application and the determining the target loading mode for the landing page based on the preloading status can enable the terminal device to load the landing page in an appropriate mode when loading the landing page, to ensure the display effect of the landing page. For example, the landing page may be loaded according to other mode when the terminal device cannot load the landing page in the target application, or the landing page may be directly loaded in the target application when the terminal device can load the landing page in the target application. This ensures that the landing page configured by the advertiser can be opened successfully, and avoids a situation that the landing page cannot be opened due to a problem of the target application or a problem of the link to the web address. Therefore, the display effect of the landing page is ensured. In addition, the landing page is loaded according to different target loading modes, so that the user can also be prompted whether the landing page has a problem according to the loading mode for the landing page.

In some possible implementations, after step 620, the server may further associate the landing page with a state identifier corresponding to the target loading mode based on the target loading mode, where the state identifier is used to enable the terminal device to determine the target loading mode corresponding to the landing page based on the state identifier.

Here, the state identifier may be associated with the landing page by the server based on a loading mode for the landing page in the target application. The state identifier may be an identifier corresponding to the loading mode for the landing page. For example, when the loading mode corresponding to the landing page is the first loading mode, a state identifier of the first loading state may be a first identifier; or when the loading mode corresponding to the landing page is the second loading mode, a state identifier of the second loading state may be a second identifier.

The terminal device may determine the target loading mode corresponding to the landing page based on the state identifier carried by the landing page and in combination with a mapping relationship between a state identifier and a loading mode.

In this way, the server associates the corresponding state identifier for the terminal device in advance, and when receiving the trigger operation for loading the landing page in the target application, the terminal device can quickly determine the target loading mode appropriate to the landing page, to load the landing page rapidly according to the target loading mode.

In some possible implementations, when the preloading status is a third state and/or a fourth state, the prompt information is output.

Here, the third state represents that the built-in browser of the target application is unable to load the landing page, and the fourth state represents that the external browser is unable to load the landing page. The prompt information is used to indicate to change the link to the web address of the landing page.

The server may load the landing page via the built-in browser of the target application installed on the emulated device, and if the preloading status corresponding to the landing page is the third state, the server may send the prompt information to a device associated with the owner of the landing page, so as to notify the owner of the landing page to change the link to the web address of the landing page by using the prompt information. Or, the server may load the landing page via the external browser installed on the emulated device, and if the preloading status corresponding to the landing page is the fourth state, the server may send the prompt information to a device associated with the owner of the landing page, so as to notify the owner of the landing page to change the link to the web address of the landing page by using the prompt information. Or, the server may load the landing page via the built-in browser of the target application installed on the emulated device, and the server continues to load the landing page via the external browser installed on the emulated device if the preloading status corresponding to the landing page is the third state, or the server may send the prompt information to a device associated with the owner of the landing page if the preloading status corresponding to the landing page is the fourth state, so as to notify the owner of the landing page to change the link to the web address of the landing page by using the prompt information.

That is, when the landing page cannot be opened by the built-in browser of the target application and/or the external browser, the prompt information may be sent to the device associated with the owner of the landing page, so as to notify the owner of the landing page to change the link to the web address of the landing page by using the prompt information. It should be understood that the owner of the landing page may refer to a user who provides the landing page, for example, an advertiser.

In specific implementation, the advertiser may configure the link to the web address of the landing page via a user interface provided by the server, and then the server determines the preloading status of the landing page via the built-in browser of the target application on the emulated device. If the preloading status is the third state and/or the fourth state, the server outputs the prompt information via the user interface, so as to notify the advertiser to change the link to the web address of the landing page by using the prompt information. The user interface may be an interface displayed on a device used by the advertiser.

In this way, when the link to the web address of the landing page has a problem, the sever can notify the user to change the link to the web address of the landing page by outputting the prompt information, to ensure an opening effect of the landing page.

Figure 7:
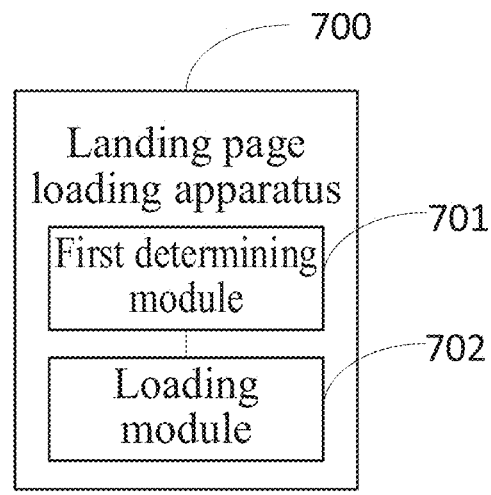
FIG. 7 is a schematically structural diagram of a landing page loading apparatus according to some embodiments.

FIG. 7 is a schematically structural diagram of a landing page loading apparatus according to some embodiments. As shown in FIG. 7, the embodiments of the present disclosure provide a landing page loading apparatus 700. The landing page loading apparatus 700 is configured in a terminal device or a server. The landing page loading apparatus 700 may include:

a first determining module 701 configured to determine a target loading mode corresponding to a landing page in response to a trigger operation for loading the landing page in a target application, where the target loading mode is determined based on a preloading status of the landing page in the target application; and a loading module 702 configured to load the landing page according to the target loading mode.

Optionally, when the preloading status is a first state, the target loading mode is a first loading mode, and the first state represents that a built-in browser of the target application is able to load the landing page.

The loading module 702 is specifically configured to:
when the target loading mode is the first loading mode, load the landing page in the target application via the built-in browser of the target application in combination with a link to a web address corresponding to the landing page.

Optionally, when the preloading status is a second state, the target loading mode is a second loading mode, and the second state represents that a built-in browser of the target application is unable to load the landing page.

The loading module 702 is specifically configured to:

when the target loading mode is the second loading mode, call an external browser to load the landing page, so as to load the landing page in the external browser based on a link to a web address corresponding to the landing page.

Optionally, the first determining module 701 is specifically configured to:

determine the target loading mode corresponding to the landing page based on a state identifier carried by the landing page, the state identifier is associated with the landing page by a server based on a loading mode for the landing page in the target application, and the loading mode is determined by the server based on the preloading status of the landing page in the target application.

Optionally, the preloading status is obtained by loading the landing page based on the link to the web address corresponding to the landing page via the built-in browser of the target application installed on an emulated device.

Functional logic executed by each functional module in the above landing page loading apparatus 700 has been described in detail in the part about the method, and details are not described herein again.

Figure 8:
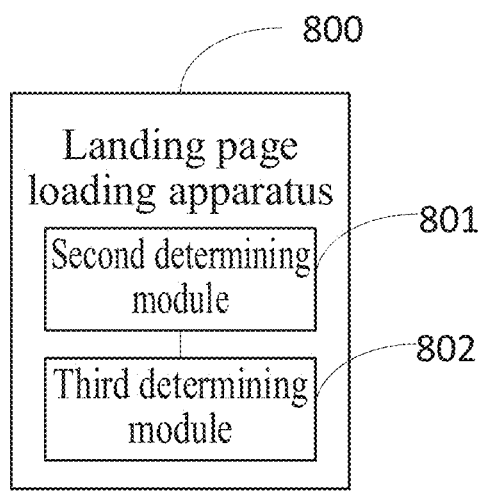
FIG. 8 is a schematically structural diagram of a landing page loading apparatus according to still some embodiments.

FIG. 8 is a schematically structural diagram of a landing page loading apparatus according to still some embodiments. As shown in FIG. 8, the embodiments of the present disclosure provide a landing page loading apparatus 800. The landing page loading apparatus 800 is configured in a server. The landing page loading apparatus 800 may include:

a second determining module 801 configured to determine a preloading status of a landing page in a target application; and a third determining module 802 configured to determine a target loading mode corresponding to the landing page based on the preloading status, where the target loading mode is used to load the landing page according to the target loading mode.

Optionally, the second determining module 801 is specifically configured to:

acquire a link to a web address corresponding to the landing page; and obtain the preloading status of the landing page in the target application by loading the landing page based on the link to the web address via a built-in browser of the target application installed on an emulated device.

Optionally, the third determining module 802 is specifically configured to:

when the preloading status is a first state, determine a first loading mode as the target loading mode, where the first state represents that a built-in browser of the target application is able to load the landing page, and the first loading mode is loading the landing page in the target application via the built-in browser of the target application in combination with a link to a web address corresponding to the landing page; or when the preloading status is a second state, determine a second loading mode as the target loading mode, where the second state represents that a built-in browser of the target application is unable to load the landing page, and the second loading mode is a mode calling an external browser to load the landing page based on a link to a web address corresponding to the landing page, so as to load the landing page in the external browser.

Optionally, the landing page loading apparatus 800 further includes:

an association module configured to associate the landing page with a state identifier corresponding to the target loading mode based on the target loading mode, where the state identifier is used to enable a terminal device to determine the target loading mode corresponding to the landing page based on the state identifier.

Optionally, the landing page loading apparatus 800 further includes:

a notification module configured to: when the preloading status is a third state and/or a fourth state, output prompt information, where the prompt information is used to indicate to change the link to the web address of the landing page.

The third state represents that the built-in browser of the target application is unable to load the landing page. The fourth state represents that the external browser is unable to load the landing page.

Functional logic executed by each functional module in the above landing page loading apparatus 800 has been described in detail in the part about the method, and details are not described herein again.

Figure 9:
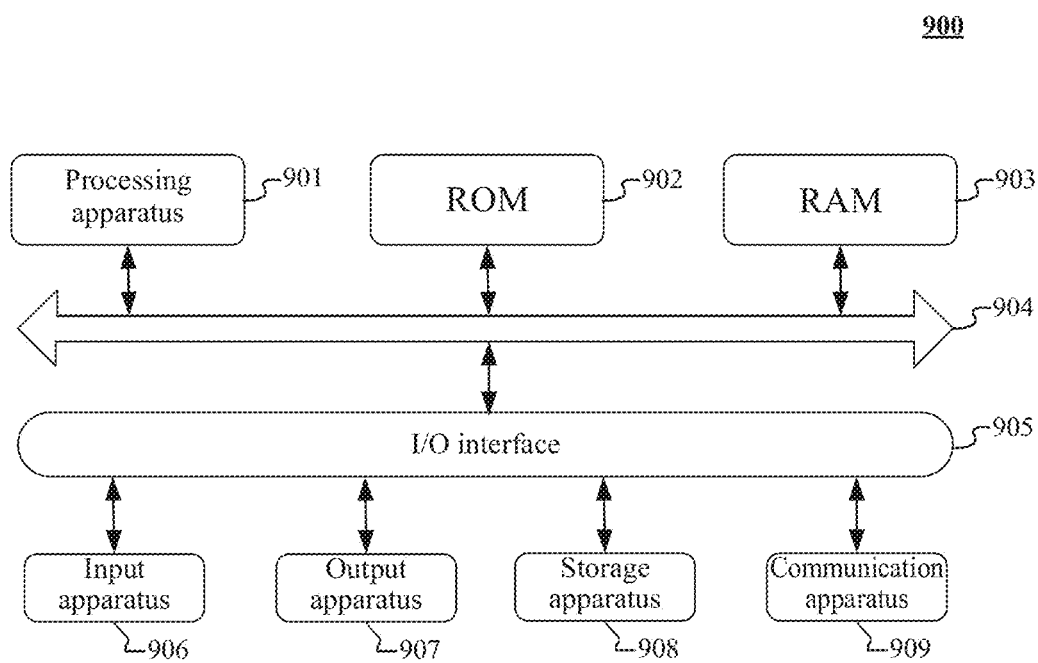
FIG. 9 is a schematically structural diagram of an electronic device according to some embodiments.

Reference is made to FIG. 9 below, which is a schematically structural diagram of an electronic device (such as the terminal device or the server in FIG. 1) 900 suitable for implementing embodiments of the present disclosure. The terminal device in this embodiment of the present disclosure may include, but is not limited to, mobile terminals, such as a mobile phone, a notebook computer, a digital broadcast receiver, a personal digital assistant (PDA), a PAD (tablet computer), a portable multimedia player (PMP), and a vehicle-mounted terminal (such as a vehicle navigation terminal), and fixed terminals, such as a digital TV and a desktop computer. The electronic device shown in FIG. 9 is merely an example, and shall not impose any limitation on the function and scope of use of the embodiments of the present disclosure.

As shown in FIG. 9, the electronic device 900 may include a processing apparatus (e.g., a central processing unit or a graphics processing unit) 901 that may perform a variety of appropriate actions and processing in accordance with a program stored in a read-only memory (ROM) 902 or a program loaded from a storage apparatus 908 into a random access memory (RAM) 903. The RAM 903 further stores various programs and data required for the operation of the electronic device 900. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906 including, for example, a touchscreen, a touchpad, a keyboard, a mouse, a camera, a microphone, an accelerometer, and a gyroscope; an output apparatus 907 including, for example, a liquid crystal display (LCD), a speaker, and a vibrator; the storage apparatus 908 including, for example, a tape and a hard disk; and a communication apparatus 909. The communication apparatus 909 may allow the electronic device 900 to perform wireless or wired communication with other devices to exchange data. Although FIG. 9 shows the electronic device 900 having various apparatuses, it should be understood that it is not required to implement or have all of the shown apparatuses. It may be implement alternatively or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 909 and installed, or installed from the storage apparatus 908, or installed from the ROM 902. When the computer program is executed by the processing apparatus 901, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example, but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) (or a flash memory), an optical fibre, a portable compact disc read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may further be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to electric wires, optical cables, radio frequency (RF), etc., or any suitable combination thereof.

In some implementations, a terminal device or a server may communicate using any currently known or future-developed network protocol, such as the HyperText Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Or, the computer-readable medium may exist independently, without being assembled into the electronic device.

The above computer-readable medium carries one or more programs that, when executed by the electronic device, cause the electronic device to: determine a target loading mode corresponding to a landing page in response to a trigger operation for loading the landing page in a target application, where the target loading mode is determined based on a preloading status of the landing page in the target application; and load the landing page according to the target loading mode.

Or, the above computer-readable medium carries one or more programs. The one or more programs cause the electronic device to: determine a preloading status of a landing page in a target application when executed by the electronic device; and determine a target loading mode corresponding to the landing page based on the preloading status, where the target loading mode is used to load the landing page according to the target loading mode.

The computer program code for performing the operations in the present disclosure may be written in one or more programming languages or a combination thereof, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, the program segment, or the part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules described in the embodiments of the present disclosure may be implemented by software, or may be implemented by hardware. The names of the modules in a certain scenario do not constitute a limitation on the modules themselves.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fibre, a portable compact disc read-only memory (CD-ROM), an optical storage device, a magnetic storage device, or any suitable combination thereof.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may also be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims. With respect to the apparatus in the above embodiments, the specific manner in which each module performs an operation has been described in detail in the embodiments relating to the method, and will not be detailed herein.

The invention claimed is:

1. A landing page loading method, comprising:
   determining a target loading mode corresponding to a landing page in response to a trigger operation for loading a landing page in a target application, wherein the target loading mode is determined based on a preloading status of the landing page in the target application; and
   loading the landing page according to the target loading mode.

2. The method according to claim 1, wherein, when the preloading status is a first state, the target loading mode is a first loading mode, and the first state represents that a built-in browser of the target application is able to load the landing page; and
   the loading the landing page according to the target loading mode comprises:
   when the target loading mode is the first loading mode, loading the landing page in the target application via the built-in browser of the target application in combination with a link to a web address corresponding to the landing page.

3. The method according to claim 2, wherein the determining the target loading mode corresponding to the landing page comprises:
   determining the target loading mode corresponding to the landing page based on a state identifier carried by the landing page, wherein the state identifier is associated with the landing page by a server based on a loading mode for the landing page in the target application, and the loading mode is determined by the server based on the preloading status of the landing page in the target application.

4. The method according to claim 3, wherein the preloading status is obtained by loading the landing page based on the link to the web address corresponding to the landing page via a built-in browser of the target application installed on an emulated device.

5. The method according to claim 1, wherein, when the preloading status is a second state, the target loading mode is a second loading mode, and the second state represents that a built-in browser of the target application is unable to load the landing page; and
   the loading the landing page according to the target loading mode comprises:
   when the target loading mode is the second loading mode, calling an external browser to load the landing page based on a link to a web address corresponding to the landing page, so as to load the landing page in the external browser.

6. The method according to claim 5, wherein the determining the target loading mode corresponding to the landing page comprises:
   determining the target loading mode corresponding to the landing page based on a state identifier carried by the landing page, wherein the state identifier is associated with the landing page by a server based on a loading mode for the landing page in the target application, and the loading mode is determined by the server based on the preloading status of the landing page in the target application.

7. The method according to claim 6, wherein the preloading status is obtained by loading the landing page based on the link to the web address corresponding to the landing page via a built-in browser of the target application installed on an emulated device.

8. The method according to claim 1, wherein the determining the target loading mode corresponding to the landing page comprises:
   determining the target loading mode corresponding to the landing page based on a state identifier carried by the landing page, wherein the state identifier is associated with the landing page by a server based on a loading mode for the landing page in the target application, and the loading mode is determined by the server based on the preloading status of the landing page in the target application.

9. The method according to claim 8, wherein the preloading status is obtained by loading the landing page based on the link to the web address corresponding to the landing page via a built-in browser of the target application installed on an emulated device.

10. An electronic device, comprising:
a storage apparatus having a computer program stored thereon; and
at least a processor configured to execute the computer program in the storage apparatus to implement steps of the method according to claim 1.

11. A landing page loading method, wherein the method is performed by a server, the method comprising:
determining a preloading status of a landing page in a target application; and
determining a target loading mode corresponding to the landing page, based on the preloading status, wherein the target loading mode is used to load the landing page according to the target loading mode.

12. The method according to claim 11, wherein the determining the preloading status of the landing page in the target application comprises:
acquiring a link to a web address corresponding to the landing page; and
obtaining the preloading status of the landing page in the target application by loading the landing page based on the link to the web address via a built-in browser of the target application installed on an emulated device.

13. The method according to claim 12, further comprising:
when the preloading status is a third state and/or a fourth state, outputting prompt information, the prompt information being used to indicate to change the link to the web address of the landing page,
wherein the third state represents that the built-in browser of the target application is unable to load the landing page, and the fourth state represents that the external browser is unable to load the landing page.

14. The method according to claim 11, wherein the determining the target loading mode corresponding to the landing page based on the preloading status, comprises:
when the preloading status is a first state, determining a first loading mode as the target loading mode, wherein the first state represents that a built-in browser of the target application is able to load the landing page, and the first loading mode is loading the landing page in the target application via the built-in browser of the target application in combination with a link to a web address corresponding to the landing page; or
when the preloading status is a second state, determining a second loading mode as the target loading mode, wherein the second state represents that a built-in browser of the target application is unable to load the landing page, and the second loading mode is a mode calling an external browser to load the landing page based on a link to a web address corresponding to the landing page, so as to load the landing page in the external browser.

15. The method according to claim 14, further comprising:
when the preloading status is a third state and/or a fourth state, outputting prompt information, the prompt information being used to indicate to change the link to the web address of the landing page,
wherein the third state represents that the built-in browser of the target application is unable to load the landing page, and the fourth state represents that the external browser is unable to load the landing page.

16. The method according to claim 11, wherein, after the determining the target loading mode corresponding to the landing page based on the preloading status, the method further comprises:
associating the landing page with a state identifier corresponding to the target loading mode based on the target loading mode, wherein the state identifier is used to enable a terminal device to determine the target loading mode corresponding to the landing page based on the state identifier.

17. The method according to claim 16, further comprising:
when the preloading status is a third state and/or a fourth state, outputting prompt information, the prompt information being used to indicate to change the link to the web address of the landing page,
wherein the third state represents that the built-in browser of the target application is unable to load the landing page, and the fourth state represents that the external browser is unable to load the landing page.

18. The method according to claim 11, further comprising:
when the preloading status is a third state and/or a fourth state, outputting prompt information, the prompt information being used to indicate to change the link to the web address of the landing page,
wherein the third state represents that the built-in browser of the target application is unable to load the landing page, and the fourth state represents that the external browser is unable to load the landing page.

19. An electronic device, comprising:
a storage apparatus having a computer program stored thereon; and
at least a processor configured to execute the computer program in the storage apparatus to implement steps of the method according to claim 11.

20. A non-transitory computer-readable medium having a computer program stored thereon, wherein, when executed by at least a processor, the program causes the at least processor to:
determine a target loading mode corresponding to a landing page in response to a trigger operation for loading a landing page in a target application, wherein the target loading mode is determined based on a preloading status of the landing page in the target application; and
load the landing page according to the target loading mode.

* * * * *